United States Patent [19]
Arney

[11] Patent Number: 4,697,762
[45] Date of Patent: Oct. 6, 1987

[54] INFLATABLE FLOAT ASSEMBLY AND UNDERCARRIAGE FOR AIRCRAFT

[76] Inventor: Donald B. Arney, 1001 - 2191 West 39th Avenue, Vancouver, British Columbia, Canada, V6M 1T7

[21] Appl. No.: 823,373

[22] Filed: Jan. 28, 1986

[30] Foreign Application Priority Data

Jan. 31, 1985 [CA] Canada ................................. 473334

[51] Int. Cl.$^4$ ............................................. B64C 25/56
[52] U.S. Cl. ................................ 244/101; 244/100 A
[58] Field of Search ............... 244/100 A, 101, 102 R, 244/105, 106, 177; 114/345, 283, 287, 292

[56] References Cited

U.S. PATENT DOCUMENTS

| | | | |
|---|---|---|---|
| 1,501,530 | 7/1924 | Driggs | 244/101 |
| 2,306,269 | 12/1942 | King | 244/102 R |
| 2,345,143 | 3/1944 | Nakagawa | 244/102 R |
| 2,361,293 | 10/1944 | Jeffries | 244/101 |
| 2,391,326 | 12/1945 | McKinley | 344/102 R |
| 2,403,754 | 7/1946 | Pierson | 244/106 |
| 2,522,340 | 9/1950 | Braden et al. | 244/105 |
| 2,954,188 | 9/1960 | O'Conner | 244/102 R |
| 2,955,785 | 10/1960 | Smith | 244/100 A |
| 3,159,364 | 12/1984 | Sheaffer et al. | 244/105 |
| 3,208,421 | 9/1965 | Landes et al. | 244/105 |

FOREIGN PATENT DOCUMENTS

| | | | |
|---|---|---|---|
| 478417 | 4/1915 | France | 244/100 A |
| 150499 | 9/1920 | United Kingdom | 244/101 |

Primary Examiner—Joseph F. Peters, Jr.
Assistant Examiner—Lynn M. Fiorito
Attorney, Agent, or Firm—Krass & Young

[57] ABSTRACT

Inflatable or pneumatic float assembly has tough outer fabric tubular shell with an upper wall having a first elongated sleeve extending therealong to receive an elongated stiffening member. A lower wall of the float is stiffener by stiffeners to provide a step having an essentially upright transversely extending step wall. The float has a plurality of internal baffles which form inflatable compartments within the float, preferable to receive air filled bladders. The elongated stiffening member extending through the first sleeve has exposed portions to provide access for attachment means which cooperate with the exposed portions to permit the stiffening member to cooperate with an aircraft undercarriage. Wheels can be provided to permit the aircraft to be amphibious for landing on land as well as water, with various structures to permit changing relative positions of the wheels and the floats. Air pressure within the floats is such that the float provides a resilient suspension to provide a smoother ride when moving on choppy water or to resiliently mount the wheels in one wheeled embodiment.

21 Claims, 16 Drawing Figures

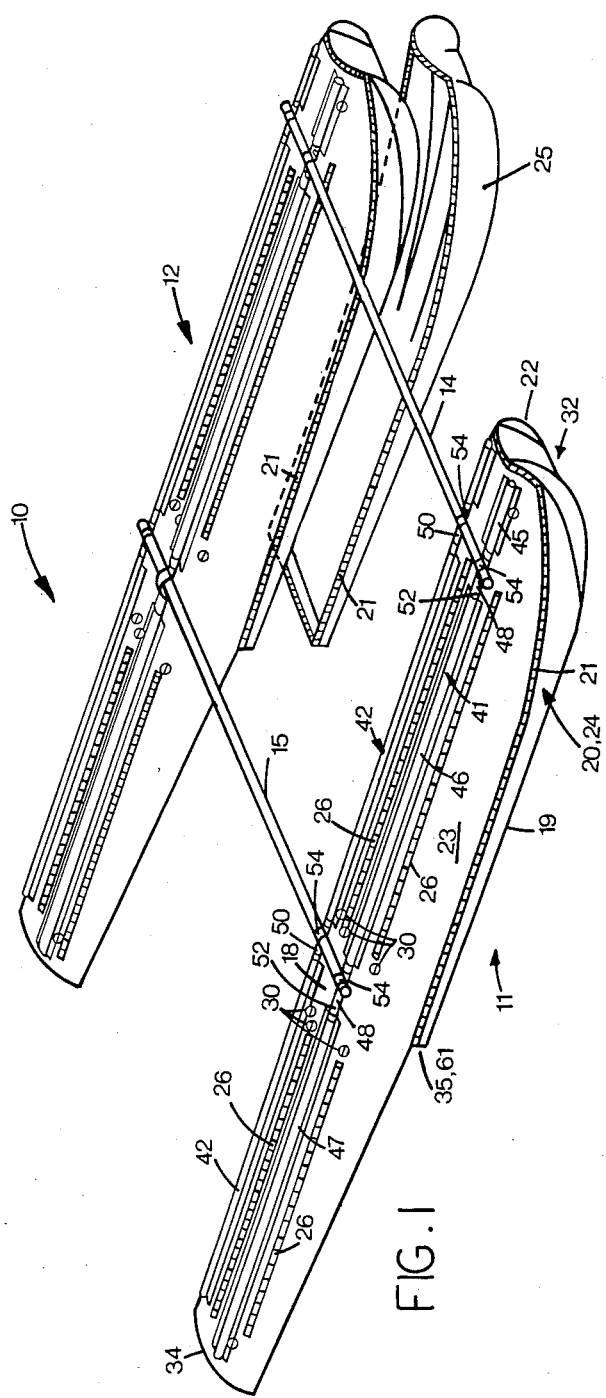
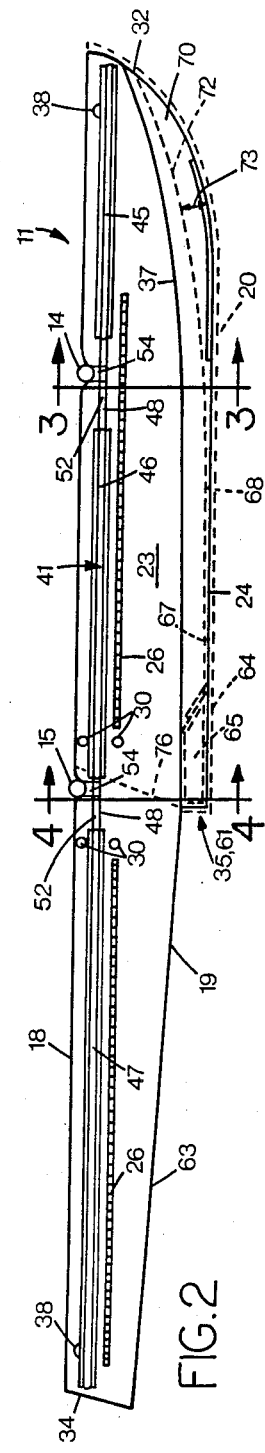
FIG.1
FIG.2

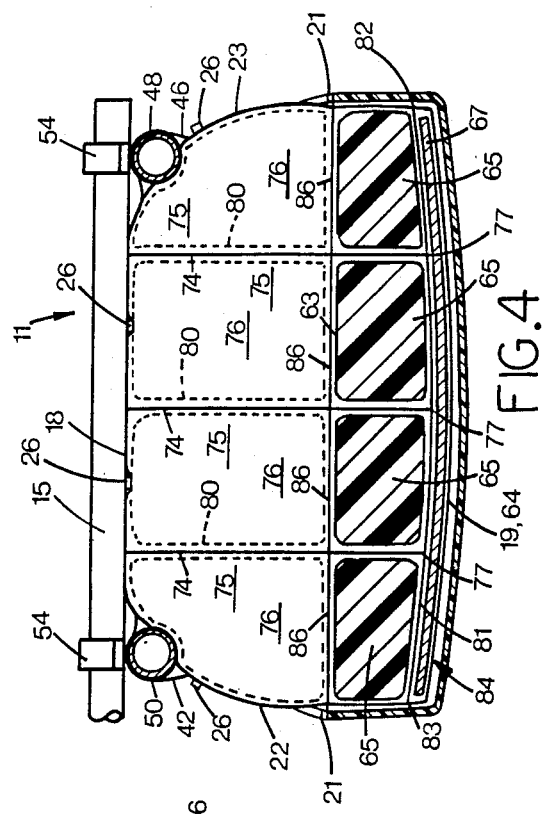
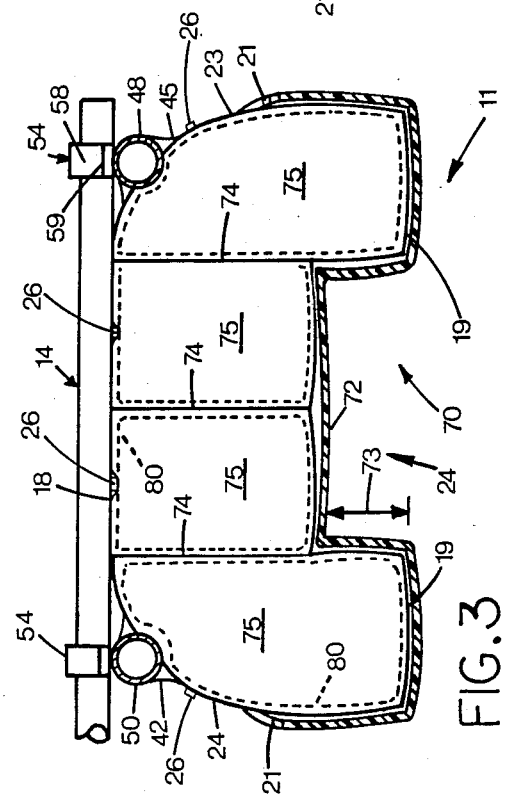
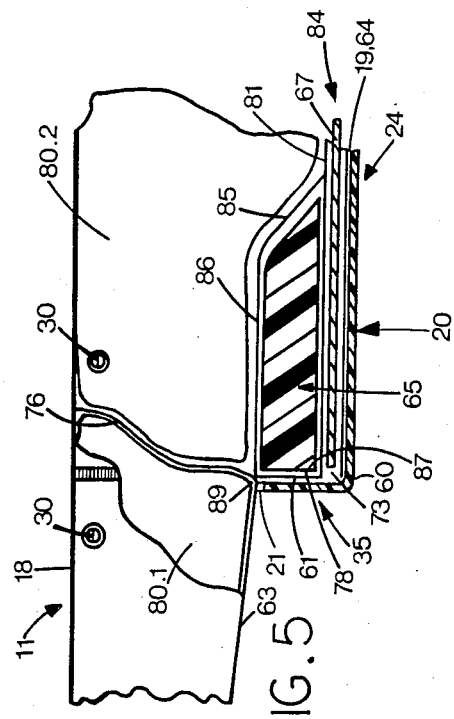
FIG.4
FIG.6
FIG.3
FIG.5

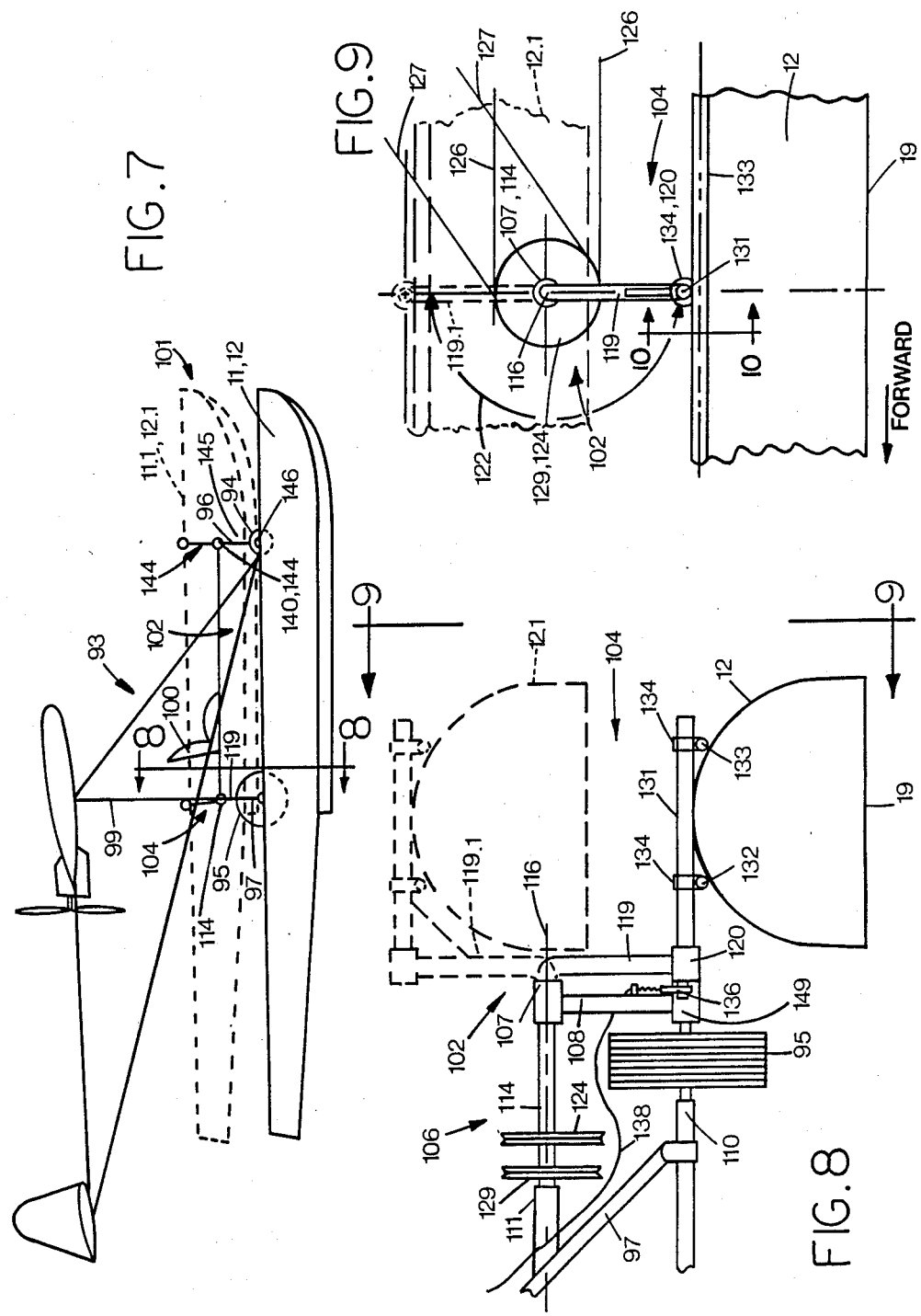

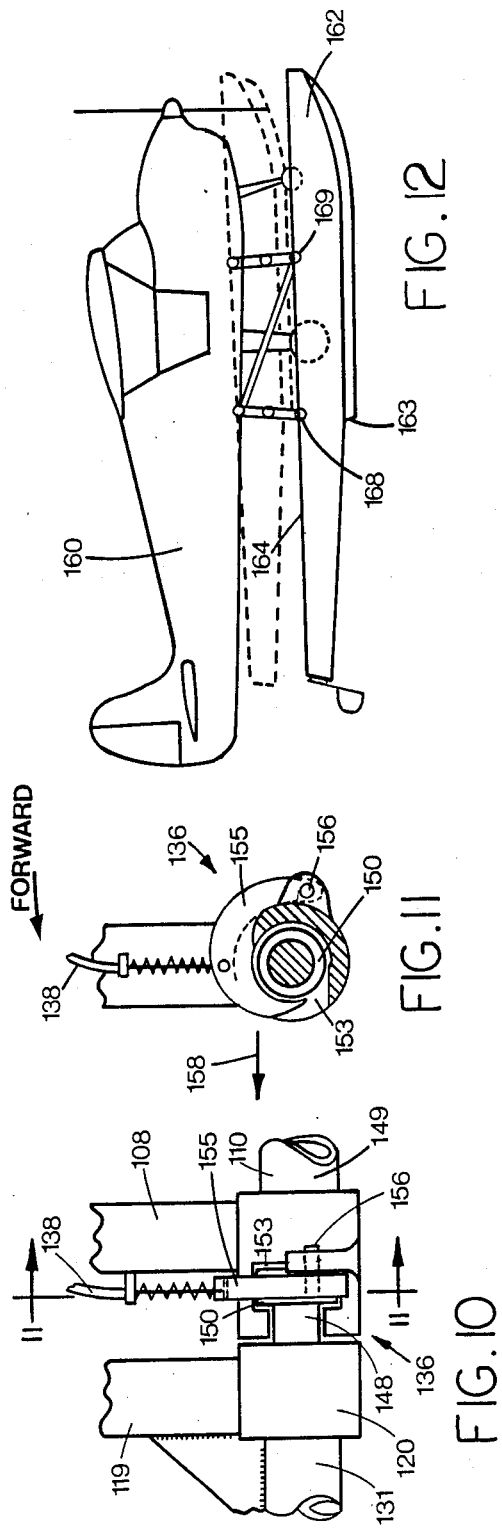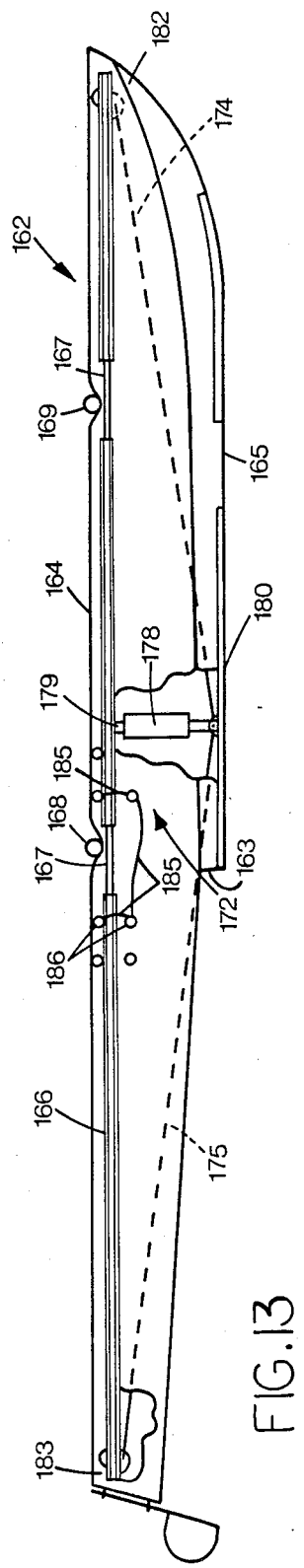

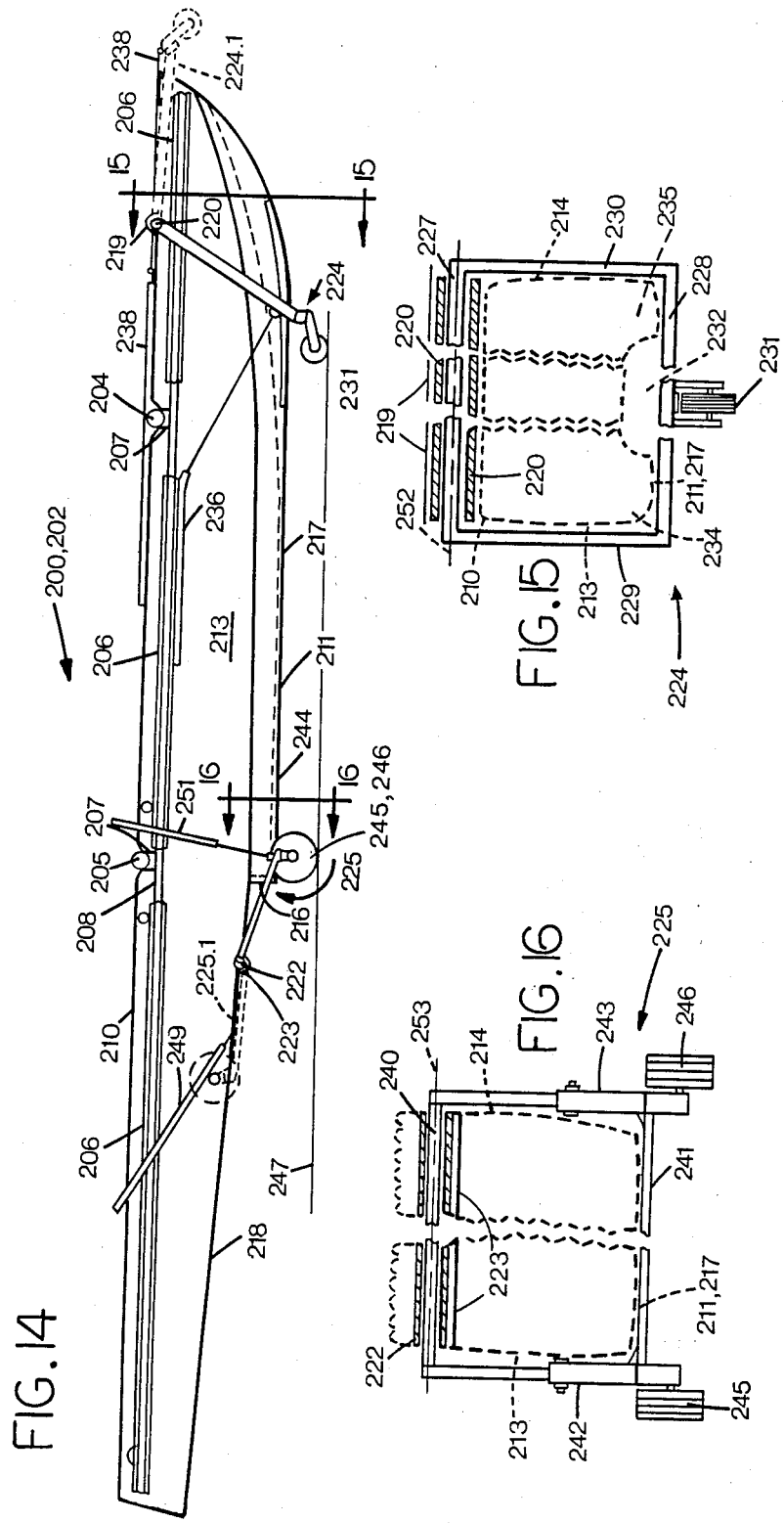

INFLATABLE FLOAT ASSEMBLY AND UNDERCARRIAGE FOR AIRCRAFT

BACKGROUND OF THE INVENTION

1. Field of the Invention

The invention relates to an inflatable or pneumatic float assembly for aircraft, particularly light and ultralight aircraft. Relative positions of the float and landing wheels of the aircraft can be changed so that the aircraft is amphibious.

2. Prior Art

Inflatable aircraft floats have been used on conventional light aircraft, one example being shown in U.S. Pat. No. 2,375,973 (Cooper et al). This patent discloses an inflatable float with internal transverse baffles in which a stiffening girder or boom is permanently fastened to either the inside or outside of the float upper wall, which results in a costly structure and one that cannot be folded into a small space for storage and shipping. Thus, while the float can be inflated it cannot be easily folded due to the relatively stiff girder which remains permanently attached to the float. Also, while this float is shown with a step, there appears to be no provision for stiffening the step to reduce deformation under load.

Most conventional amphibious aircraft have rigid metal floats, with a pocket therein which accept retractable landing wheels, thus permitting the aircraft to land on land, when the wheels are extended, or to land on water when the wheels are retracted. Such floats are heavy and costly, and the weight and complexity would be inappropriate for the relatively low power, simplicity and light weight associated with ultralight aircraft. While glass reinforced plastic floats have been used with ultralight aircraft, such floats tend to be relatively heavy and weak, and are clearly not collapsible for storage. Furthermore, most floats are not very resilient and this contributes to a rough ride on choppy water.

While most conventional amphibious light aircraft retract wheels into pockets in fixed floats, it is known to have fixed wheels in combination with movable floats that can be raised to permit the aircraft to use land or water. One example of this type of arrangement for an amphibious aircraft is shown in U.S. Pat. No. 3,159,364 (Sheaffer et al) in which laterally disposed pockets in the floats provide clearance for the wheels when the floats are in the lowered position. In most amphibious aircraft, mechanisms for raising and lowering the floats or wheels are relatively complex, and the pocket for the wheels introduces considerable complications in float design, and would be too costly and heavy for an ultralight aircraft.

SUMMARY OF THE INVENTION

The invention reduces difficulties and disadvantages of the prior art by providing an inflatable float assembly particularly for ultralight aircraft, but the floats could be adapted for use with other conventional aircraft. In some embodiments the floats can be retractable, that is they can be moved relative to fixed wheels of the aircraft, which permits easy adaptation to existing aircraft fixed undercarriage legs, without requiring retractable wheels. In other embodiments, wheels can be moved relative to fixed floats. In all embodiments of the invention, whether the wheels or the floats are movable for amphibious use the wheels are positioned to be clear of the float, so that the float does not require a pocket to provide clearance for the wheels in either position. Air pressure within the float provides a resilient suspension when on water, or in one embodiment, the float cooperates with the wheels to resiliently mount the wheels, thus eliminating the need for a separate resilient suspension for the wheels. The float is fabricated from a tough flexible fabric and cooperates with rigid stiffening means through a simple structure which permits easy separation of the rigid stiffening means from the float fabric. This permits the float fabric to folded away for storage, and also reduced complexity of the structure, thus simplifying manufacturing and reducing cost and weight.

An inflatable float assembly according to the invention has a flexible, tough, outer fabric tubular shell having elongated upper and lower walls interconnected by spaced first and second elongated side walls to form an elongated generally tubular float having an interior. The upper wall has a first elongated sleeve means extending longitudinally therealong, the sleeve means having access means. A first elongated stiffening member extends freely through the first sleeve means, the stiffening member being adapted to cooperate with the aircraft. A plurality of baffles extend between at least one pair of oppositely spaced apart walls, so as to form a plurality of inflatable compartments within the interior of the float. A plurality of air tight bladders having valve means to pass gas can be used, one bladder being fitted within each compartment of the float so that when the compartments or bladders are fully inflated with gas, the float assumes an essentially rigid form.

The stiffening member has exposed portions adjacent the access means of the sleeve means. Attachment means cooperate with the exposed portions of the stiffening member to permit the stiffening member to cooperate with an aircraft undercarriage, thus simplifying connection of the floats to the aircraft. The lower surface of the float has a step which has an essentially upright transversely extending step wall. The lower wall of the float also has forward and aft portions which are spaced vertically apart adjacent opposite ends of the step wall, so as to provide the step to assist in planing and rotation of the float at take off. Stiffening means are provided adjacent the step to resist deformation under load.

A detailed disclosure following, related to drawings, describes several embodiments of the invention, which is capable of expression in structure other than that particularly described and illustrated.

DESCRIPTION OF THE DRAWINGS

FIG. 1 is a simplified perspective of a pair of inflatable floats according to the invention, shown on a rigid mounting for fitting to undercarriage legs of an ultralight aircraft, a wear-resisting cap of one of the floats being shown removed, FIG. 2 is a simplified side elevation of one of the floats of FIG. 1, a lower surface of the wear-resisting cap being shown in broken outline, FIG. 3 is a simplified fragmented section on line 3—3 of FIG. 2, FIG. 4 is a simplified fragmented section on line 4—4 of FIG. 2, FIG. 5 is a simplified fragmented side elevation adjacent a step portion of the float, showing also some internal detail, FIG. 6 is a simplified fragmented elevation of an end of a bladder fitted within the float adjacent the step, FIG. 7 is a simplified diagram showing a conventional ultralight aircraft with wheel landing gear also fitted with an inflatable and retractable float assembly according to the invention, the float assembly being shown in lowered and raised positions for use on water and land respectively, FIG. 8 is a simplified fragmented section of a portion of one float assembly, shown in raised and lowered positions, as would be seen from line 8—8 of FIG. 7, FIG. 9 is a simplified fragmented side elevation of the float and float mounting assembly, as would be seen from line 9—9 of FIG. 8, shown in lowered and raised positions respectively, FIG. 10 is a simplified fragmented rear elevation of a latch means and portions of the float and wheel mounting assembly, as seen from line 10—10 of FIG. 9, FIG. 11 is a simplified fragmented section of the latch means, as seen from line 11—11 of FIG. 10, FIG. 12 is a simplified diagram showing a conventional light aircraft with fixed tricycle undercarriage fitted with a third embodiment of the invention, the float being shown in lowered and raised positions, FIG. 13 is a simplified, fragmented side elevation of an inflatable float according to the invention as modified for use with conventional light aircraft, some portions being removed to show internal detail, FIG. 14 is a simplified side elevation of a portion of a fourth embodiment of the invention, showing one fixed float and retractable undercarriage legs and wheels for use on land, the wheels being shown in lowered and raised positions, FIG. 15 is a simplified section on line 15—15 on FIG. 14, showing a forward undercarriage leg cooperating with the float, FIG. 16 is a simplified section on line 16—16 of FIG. 14, and aft undercarriage leg cooperating with a portion of the float.

In several of the drawings, for simplicity thin fabric is depicted in cross-section as a single full line. Fabric and some adjacent parts are shown separated for clarity, but in practice they would be in close contact due to inflation pressure etc.

DETAILED DISCLOSURE

FIGS. 1 through 6

In FIG. 1, a first embodiment 10 of a float assembly according to the invention has first and second floats 11 and 12 interconnected by forward and aft transverse booms 14 and 15 respectively. The floats are essentially identical and thus only the first float will be described in detail.

The float 11 has a flexible, tough, outer fabric tubular shell having elongated upper and lower walls 18 and 19 respectively, interconnected by spaced first and second elongated side walls 22 and 23 respectively. The fabric can be that as used in inflatable boats, reinforced where required by high strength fabrics such as "Kevlar", a registered trade mark of Du Pont. Because it can deform resiliently such fabric can have a greater effective resistance to abrasion and penetration than aluminum or glass reinforced plactic used in conventional floats. As best seen FIGS. 3 and 4, the side walls and upper wall are smoothly interconnected so as to provide a generally convex upper surface, whereas the lower wall has a varying surface as will be described. The walls provide and elongated generally tubular float having a hollow interior. A wear resisting cap 20 is releasably connected to a forward portion 24 of the lower wall 19 by a peripheral zip fastener 21 which is open-ended to permit complete separation of the cap 20 from the float. As will be described, the cap 20 is complementary to the forward portion 24 and is a formed sheet of high density polymer which is highly wear resisting, flexible and lightweight, and protects the fabric of the portion 24 from most wear occurring in shallow water or from contacting obstacles. For illustration, the cap 20 is shown in broken line in FIG. 2, and a similar wear resisting cap 25 is shown in FIG. 1 separated from the float 12.

The embodiment 10 is particularly adapted for fitting to an ultralight aircraft as a substitute for the conventional ultralight aircraft landing wheels, which are either tricycle type or "tail-dragger type". Normally, in the simplest arrangement, the landing wheels would be removed, and the floats substituted so that the aircraft could only land on water, and thus is not amphibious. For this arrangement, the forward and aft booms 14 and 15 can be attached to undercarriage legs, not shown, after removing the existing wheel axles. Many ultralights have a rear axle carrying rear wheels at outer ends thereof, and thus the boom 15 can be substituted for the aft axle of the wheeled landing gear, and the boom 14 would be attached to a forward portion of the aircraft.

In FIGS. 1 and 2, the upper surface 18 of the flat has eight axially disposed zip fasteners designated 26, which provide access to the interior of the float to install bladders, as will be described. Also, the surface 18 has a plurality of fill/dump valves 30 adjacent ends of the zip fasteners, which are for admitting compressed air into the bladders for inflating the floats, and for deflating the floats when required. For simplicity only four axially disposed zip fasteners 26 are shown in FIG. 1, and only two are shown in FIG. 2. Also, the float 11 has bow and stern portions 32 and 34, and the lower wall 19 has a step 35. A spray strip, not shown, can extend generally adjacent the zip fastener 21 from the bow to the step on the side wall 23, and a similar spray strip, not shown, will extend similarly on the side 22. Tie-up rings 38 are provided for mooring and for rigging lines, not shown, so as to increase rigidity of the attachment to the aircraft as required.

Two important features of the invention relate to the means for stiffening the floats and securing the float assembly to the booms 14 and 15, or equivalent aircraft structure. This is attained by providing similar first and second, laterally spaced, generally parallel, elongated sleeve means 41 and 42 which extend longitudinally along the upper surface 18. The sleeve means 41 has forward, intermediate and rear sleeve members, 45, 46 and 47 which are longitudinally spaced apart and aligned with each other to receive a first elongated stiffening member 48 threaded therethrough. The first stiffening member extends freely the full length of the float, but is collapsible into several individual pieces for ease of storage. However, it has sufficient rigidity, together with a second similar stiffening member 50 which is threaded through the second sleeve means 42, to provide a pair of spaced stiffening means extending essentially the full length of the float. These stiffening members increase considerably stiffness of the inflated floats, and also facilitate attachment to the aircraft.

Adjacent ends of the sleeve members 45 and 46, and the sleeve members 46 and 47, are spaced apart to expose portions of the stiffening member 48, which is to provide easy access to the stiffening member for connection with the booms 14 and 15. As will be described with reference to FIGS. 3 and 4, attachment means 54 cooperate with outer end portions of the booms 14 and 15 to secure the booms to the members 48 and 50. The spaces between adjacent ends of the sleeve members are small and thus provide limited access means 52 to expose the members 48 and 50 for attaching the attachment means 54, which interfere with the ends of the sleeve to limit movement of the floats relative to the booms. It can be seen that the stiffening members extend freely through the sleeve means for easy insertion and removal, but interference between the attachment means and ends of the above sleeve members, releasable fasteners if required, and forces from inflation pressure limit this movement to locate the stiffening members within the sleeves so that the float and stiffening members function as a unit. At least one outer end of each sleeve means should be open to permit threading of the stiffening members.

Referring to FIG. 3, a typical attachment means 54 can be seen to have an upper tubular portion 58 adapted to enclose the boom 14, and a lower bracket portion 59 to secure, e.g. with releasable fasteners, to the member 40 so that the boom and member 48 are connected perpendicularly. There are many types of attachment means that will serve this purpose, care being taken that the attachment means do not weaken unduly the boom or stiffening member. For the embodiment shown in FIG. 1, the boom and member 48 should be connected non- rotationally. However, for other applications it may be desirable to permit relative rotation between the boom and stiffening member. The use of longitudinal sleeves with access means for connecting the attachment means provides a simple, releasable lightweight connection for connecting the floats to the aircraft undercarriage legs.

As seen in FIG. 2, the lower wall 19 has the forward portion 24 and an aft portion 63 which are spaced vertically adjacent opposite edges of a transversely extending step wall 61 of the step 35. The step assists in planing and rotation of the float for take-off and is common practice with rigid, non-inflatable aircraft floats. This clearly contrasts with the conventional tubular inflatable pontoon commonly used with helicopters, which of course do not require a step for planing. As will be described in greater detail with reference to FIG. 5, stiffening means cooperate with the transversely extending step wall 61 and an aft portion 64 of the forward portion 10 of the lower wall, so that the step has a relatively sharp lower corner to improve the efficiency of planing. The stiffening means, shown in broken outline in FIG. 2, includes a plurality of relatively stiff foam plastic filler blocks 65 and a relatively stiff stiffener sheet member 67 which extends to a position 68 which is approximately mid way along the forward portion 24 of the lower wall. As also seen in FIG. 3 the forward portion 24 has a recessed central portion 70, having a central upper wall 72 which defines in part a tunnel which has a depth 73 which diminishes aftwards and terminates forwardly of the step, adjacent the position 68, coinciding with the forward portion of the stiff sheet member 67 at position 68. The blocks 65 can be a high density, closed cell, though resilient polymer foam, and the sheet member 67 can be high grade plywood 4-5 mm thick.

Referring to FIGS. 3 and 4, the interior of the float is divided by a plurality of baffles as follows. Three essentially similar longitudinal baffles 74 extend between the bow and stern portions 32 and 34 to divide the float longitudinally into four generally equal longitudinal compartments 75. Adjacent the step 35 a plurality of transverse baffles 76 divide each of the longitudinal compartments into forward and aft portions, making a total of eight compartments 75 per float, each compartment having one bladder 80 and being accessible through one particular zip fastener 26. Preferably, each baffle extends between two pairs of oppositely spaced apart walls or baffles, i.e., each baffle is secured essentially completely around its periperhy to adjacent material. However, in some cases a baffle may extend only between one pair of oppositely spaced apart walls. Thus, the interior of the float has a plurality of baffles 74 and 76 which extend between pairs of oppositely spaced apart walls so as to form a plurality of compartments within the interior of the float. A complementary airtight bladder 80 is installed through the respective zip fasteners 26 into each compartment of the float so that when the bladders are fully inflated with gas the flow assumes an essentially rigid form. Several bladders are shown schematically in FIGS. 3 and 4 in broken outline and designated 80.

In FIGS. 4 and 5, an inner wall 81, which is a strip of fabric, is secured to and extends between the float sidewalls 22 and 23 to form a lower wall stiffener sleeve 84 with the aft portion 64, which receives the relatively stiff sheet member 67. It can be seen in FIG. 4 that the lower wall stiffener sleeve 84 has two opposite side edges 82 and 83 secured to respective side walls 23 and 22 of the float. The sleeve 84 has an open aft end 73 adjacent the step 35 and a closed forward end adjacent and secured to the position 68 on the wall 19. Lower edges 77 of the three longitudinal baffles 74 are secured to the inner wall 81 leaving clearance from the portion 64, so that stiffener sleeve 84 extends the full width between side walls of the float. The aft portion of the lower wall 19 of each forward compartment 75 has a filler block pocket means 79 adjacent the step wall 61 to retain a respective filler block 65. Thus there are four filler blocks 65 for each float, but only one stiffener sheet member 67 for each float. The lower wall stiffener sheet 67 is bowed downwardly from side walls of the float by in ation pressure to increase its stiffness and to provide a crowned hull forwad portion for the float. Also, the pocket means 79 of each compartment includes a closable fabric pocket 86 complementary to the block 65 and provided at aft ends of the foward compartments, and adjacent the lower wall of the float. The pockets have closable flaps 85 at forward ends thereof. Each filler block 65 has a right angle lower aft corner 87 and an aft wall 78 having a depth at least generally equal to depth of the step wall to define the step. The sheet member 67, the filler block 65, the sleeve 84, the pocket means 79 and the cap 20 cooperate so that the step 35 has a relatively sharp, resilient but tough lower corner so as to improve efficiency of planing.

Referring also to FIG. 5, a forward portion of an aft bladder 80.1 and an aft portion of an adjacent forward bladder 80.2 sandwich the transverse baffle 76 therebetween as shown. In order to obtain a relatively sharp step 35, the baffle 76 has a lower edge 89 secured adjacent the step wall 61 so that the baffle is generally aligned with the step wall 65 so as to control location of the ends of the bladders adjacent the step. The aft end of the inflated unrestrained bladder 80.2 is shown in FIG. 6 and is shaped to provide adequate fullness to accommodate the filler block 65 and clearly has a depth greater than the aft bladder 80.1. It can be seen that the step wall 61 has a lower transverse edge 60 to provide the sharp or well defined lower corner of the step, and an upper transverse edge generally adjacent the zipper 21. Vertical spacing between the upper and lower transverse edges reflects vertical spacing between the forward and aft portions of the float lower wall.

FIGS. 7 through 11

The first and second floats 11 and 12 are shown in FIG. 1 in a simple, non-retractable embodiment, for use with an ultralight aircraft. The same floats can be used with an ultralight aircraft 93 fitted with a conventional landing gear having a forward wheel 94 and an aft wheel pair 95 connected to respective legs 96 and 97. With simple conversion, the aircraft can be made to be amphibious. The legs extend from a conventional ultralight space frame 99 forming the fuselage which is provided with a seat 100 for the operator, not shown. The floats 11 and 12 are a portion of a float assembly 101 and are shown in full outline in lowered positions wherein the floats extend below the wheels for landing on water, and in broken outline at 11.1 and 11.2 in raised positions wherein the wheels extend below the floats for landing on land. The invention can be modified to cooperate with other ultralight aircraft landing gear. The aircraft is fitted with a float lowering and raising means 102 according to the invention which is generally symmetrical and moves both floats simultaneously and is described in greater detail with references to FIGS. 8 through 11.

Referring also to FIGS. 8 and 9, structure associated with the port float 12 only is described. The lowering and raising means 102 has two essentially similar crank means for forward and aft portions of each float, for example cooperating with forward and aft float attachment means which are equivalent to the booms 14 and 15 of FIG. 1. To permit the floats to be raised and lowered, the booms 14 and 15 are eliminated and the alternative crank means substituted as follows.

A first crank means 104 associated with one of the rear wheels 95 and legs 97 has a first crank journalling means 106. The means 106 includes an outer bearing 107 mounted at an upper end of a rod 108 extending from an outer end of an axle 110 carrying the wheel 95. The axle 110 is connected to the legs 97, both of which can be existing portions of the aircraft. The crank journalling means 106 also includes an inner bearing 111 secured to the leg 97 and aligned with the bearing 107, with the two bearings carrying a crank shaft 114 for rotation about a first transverse crank axis 116. The crank shaft has a first crank arm 119 extending to an outer portion 120 thereof which sweeps through an arc 122 as the crank shaft is rotated through approximately one-half of a revolution as shown. The crank arm 119 is shown in a lowered position in full outline at 119, and in a raised position 119.1 in broken outline at extreme limits of the arc. The shaft 114 carries a pulley 124 which is secured thereto and carries several turns of a loop of linking cable 126. The loop of cable 126 also passes around a similar second pulley, not shown, secured to second crank means 140 associated with the forward portion of the float. A loop of control cable 127 has a lower portion wrapped several times around a third pulley 129 secured to the shaft 114 and an upper portion of the loop extends to an operator's control pulley, not shown.

As the control pulley is rotated, the cable 127 rotates the pulley 129 which rotates to swing the crank arm 119 to the raised position, where the lever can be locked, by means not shown.

A first transverse rod or float connecting means 131 is rigidly connected to the outer portion 120 of the crank arm and carries two attachment means 134 secured to elongated stiffening members 132 and 133 fitted in respective sleeve means on the floats, and are equivalent to the members 48 and 50. The attachment means 134 are connected to the stiffening members 132 and 133 in a manner similar to the attachment means 54, FIGS. 1 and 2, with the additional provision of permitting relative rotation between the float and the crank arm. Consequently, upper portions of the attachment means 134 have simple bearings within tubular portions thereof to permit the transverse 131 to rotate within the attachment means 134.

In the lowered position as shown in full outline in FIGS. 8 and 9, the rod 131 is shown aligned with the existing axle 110. A latch means 136, to be described with reference to FIGS. 10 and 11, is fitted to an end portion 149 of the axle 110 to releasably connect together in the said alignment the axle and transverse float connecting means. A control cable 138 extends from the latch means 136 to an operator control for release by the pilot when required.

As stated previously with reference to FIG. 7, the lowering and raising means 102 has two essentially similar crank means, the second crank means 140 being associated with the float front portion. The second crank means is similarly journalled on a fixed portion of the aircraft so as to be generally longitudinally aligned with the first crank journalling means. The means 140 has a second crankshaft 144 journalled to permit rotation about a second transverse crank axis, not shown, which is spaced longitudinally from the first crankshaft axis and similarly permits rotation through half a revolution as a respective second crank arm 145 is rotated in a manner similar to the first crank arm 119. The endless loop of cable 126 passes around the second pulley, not shown, mounted on the crankshaft 144 so that both crankshafts are connected together for mutual rotation to move respective portions of the float concurrently. Similarly, a second transverse rod or float connecting means 146, equivalent to the boom 14, cooperates with forward portions of the stiffening members 132 and 133. As seen in FIG. 7, the first and second crank arms 119 and 145 are disposed parallel to each other, that is they form two opposite sides of a parallelogram mechanism, in which the remaining two sides are a portion of the aircraft space frame 99, and a portion of the float extending between the float connecting means. Thus, when the float is in the lowered position as shown in FIG. 7 in full outline, the two crank arms are essentially parallel to each other and extend downwardly from the respective crankshaft journalling means. Similarly, as each crankshaft is rotated through approximately one-half of a revolution, the respective crank arms swing through the arc 122 to the raised position, shown in broken outline. It is added that there is some longitudinal movement of the float as it is raised or lowered. This has an effect on the center of gravity of the aircraft and therefore should only be performed when in a stable flying condition. It is added, due to the relative lightness of the floats, this is a relatively negligible effect and can be easily compensated by the pilot.

It can be seen that the float in the raised position is essentially at the same attitude relative to the normal direction of flight as in the lowered position. Consequently, if there were any failure in the means of lowering the floats to the lowered position for landing on water, an emergency water landing with raised floats would be possible without necessarily resulting in severe damage to the aircraft, or danger to the pilot. Preferably some lock means for locating the floats in the raised position is desirable, and this could be something as simple as locking the pilot's operating lever connected to the cable 127 in a raised position. However, a more positive direct means of locating the float in the lowered position is preferred, and the latch means 136, as described in FIGS. 10 and 11, is one means of insuring a positive location of the float in the lowered position. It is noted that the crank arm 119 rotates forwardly to raise and lower the float. This is preferred to simplify the latch means 136.

Referring to FIGS. 10 and 11, the latch means 136 includes a necked projection 148 which extends inwardly towards the wheel axle 110 from the outer portion 120 of the crank arm 119. The projection 148 has an enlarged cylindrical head portion 150 and both the projection and the enlarged head portion are received in a complementary forward facing recess 153 disposed adjacent the outer end portion 149 of the wheel axle 110. A hinged locking member 155 is connected to the coupling means 138 and can be rotated upwardly about a hinge pin 156 connected adjacent to the portion 149 of the axle 110. The locking member is hook-shaped and is spring urged to a lowered position as shown, in which it encloses the head portion 150 to prevent the head portion moving forwardly in direction of an arrow 158 out of the recess. When the portion 150 is within the recess, the portion 150 is also restrained against axial movement by the complementary recess at the end of the axle. Thus the float is restrained against relative movement in any direction. When this arrangement, it can be seen that the float can only move forwardly out of the recess 153 if the coupling means 138 is actuated to raise the member 155. This would be required to raise the float, and when the float is lowered again the head portion 150 would tend to be forced against the locking member 155 by drag forces acting on the flat. This tends to "cam" the locking member 155 upwardly to permit the enlarged head portion 150 and projection 148 to enter the recess 153, after which the locking member returns to lock the axle aligned for landing on water.

It can be seen that drag forces from either air or water act rearwardly on the lowered float, tending to hold the head 150 in the forward facing recess 153, thus eliminating any tendency for accidental disengagement of the float.

OPERATION

The floats can be easily assembled from a relatively small lightweight package by extending the float and inserting the stiffener sheet member 67 through the open aft end 73 of the lower wall stiffener sleeve 84, and inserting the filter blocks 65 into the respective fabric pockets 86 through the open zip fasteners 26. The stiffening members 48 and 50 are then inserted through the sleeves, and the bladders are installed within the compartments as required through the open zip fasteners 26. The wear resisting cap 20 is connected by the zip fasteners 21 to the float after adding some air but before inflating to final pressure. Rear wall of the cap 20 closes the open end 73 thus retaining the stiffener member 67 within the sleeve 84. Additional air is then added to the fill/dump valves as required so as to inflate the bladders, at generally equal final pressures, typically in the range of the 1–3 lbs per square inch (0.070–0.211 Kg per square cm).

The relatively simple first embodiment of the float assembly, as shown in FIGS. 1 through 6, would be fitted to a conventional ultralight aircraft by substituting the existing axle for the boom 15 and connecting the forward boom 14 to the forward undercarriage leg after removing the forward wheels. Cables can be used to rig the booms relative to the aircraft frame. Alternatively the existing rear axle could remain, but the rear wheels would be removed and the float could then be fitted to ends of the axle, the forward boom 15 being required as before. This would permit the ultralight aircraft to take off and land on water, but clearly would not be amphibious in this configuration.

The embodiment of FIGS. 7 through 11 is amphibious and the floats can be raised and lowered through the simple parallelogram mechanism as previously described. The existing wheels remain in place and the parallelogram mechanisms and controls are fitted to the aircraft. Other aspects of the float assembly are similar to that of FIGS. 1 through 6.

ALTERNATIVES AND EQUIVALENTS

As disclosed, the invention has two elongated stiffening means 48 and 50 in respective sleeves. Two elongated stiffening members are preferred because this prevents limited rotation of the float about its longitudinal axis, as well as providing stiffness against bending. If desired one stiffening member in a central sleeve could be substituted, but alternate means to prevent limited rotation of the float would be required.

Also, the float interior is disclosed with a plurality of baffles 74 and 76 forming the compartments 75 with each compartment having a separate, air-impermeable, valved bladder 80. This is preferred because the relatively weak bladder material is protected by the tough outer shell which tends to be air permeable. Alternatively, if a suitable tough, air permeable outer shell is used, the bladders can be eliminated. However the internal baffles are necessary to maintain shape of the float and these cannot be eliminated.

FIGS. 12 through 13

The above embodiment of float assembly is disclosed for use with an ultralight aircraft. Because ultralight aircraft are exceptionally light when compared with conventional light aircraft, the float is relatively light and can not resist excessive bending forces. Because engine power is relatively low, dynamic forces incurred during landing and taking off are also relatively low, and relatively low bending forces can be accomodated using stiffening members of aluminum alloy tubes as commonly used on ultralight aircraft. The use of this invention is also contemplated for conventional light aircraft, typically of the Cessna 172 size and equivalents. An aircraft of this type, when fitted with conventional tricycle landing gear, is adaptable for use with retractable floats as described for use with the ultralight aircraft. However, because of the considerable difference in weights and engine power between conventional light aircraft and ultralight aircraft, a considerably stronger inflatable float would be required to support the higher weight and dynamic forces of the conventional light aircraft. In the ultralight embodiment of the float assembly, the stiffness of the float is provided mainly by the two longitudinal stiffening members 48 and 50. While air pressure, dimensions, and material size and strength could be increased, to increase stiffness of the float additional means are considered necessary to support the weight and dynamic forces of a regular light aircraft as will be described.

A conventional light aircraft 160 is shown fitted with modified floats 162 according to the invention, one float being shown with a step 163 on a lower wall 165. The modified float 162 has a similar flexible, tough outer fabric tubular shell formed of walls which define the interior, the interior being divided by baffles into separate compartments which receive respective bladders. The modified float also has an upper wall 164 carrying first and second elongated sleeve means 166 which are generally parallel and spaced transversely apart, one sleeve means only being shown in FIG. 13. The sleeve means include a plurality of longitudinally spaced apart sleeve members aligned with each other to respective elongated stiffening members threaded therethrough, one stiffening member 167 only being shown. Adjacent end portions of the sleeve members are spaced apart to expose the stiffening member to provide the access means for cooperation with float attachment means 168 and 169 as previously described.

A major difference between the floats 10 and 11 and the modified float 162 relates to means to provide additional stiffness for the float to accomodate the considerable increase in weight of the aircraft. A float stiffening structure 172 includes fore and aft cables 174 and 175 shown in broken outline. A downwardly extending resilient cylinder 178, positioned approximately midway along the float, has an upper end connected to an anchor 179 adjacent the upper wall 164 of the float and cooperating with the stiffening members 167. The cylinder has a lower end connected to a stiffener sheet 180 supporting a portion of the lower wall 165 adjacent the step 163, the sheet 180 extending full width of the float. Preferably, the sheet 180 cooperates with adjacent stiffening means, not shown, to stiffen the step 163 against deformation as previously described. Inner portions of the cables 174 and 175 are connected to a lower portion of the cylinder 178, while outer portions of the cables are connected to outer ends of the stiffening member 167 adjacent the bow and stern 182 and 183 respectively. If the cylinder 178 were essentially incompressible, and the cables 174 and 175 were taut, it can be seen that the cables, the cylinder 178 and the stiffening members 167 resemble a triangulated truss which increases resistance of the float to bending upwardly to cause the upper wall 164 to become concave. In effect, the cables 174 and 175 afe tension members to resist this upwards bending, and if the cylinder 178 has a variable resistance to compression, the stiffness of the float can be adjusted. Thus the cylinder 178 can act as a spring means or shock absorber to permit the float to yield upon impact with the water when landing. It may be helpful to provide some resilience in the cables 174 and 175 also.

The enhanced float stiffening structure 172 thus increases considerably the stiffness available from a pneumatic float which is considered necessary to handle the considerable increase in weight of a light conventional aircraft over an ultralight aircraft. Other means to increase stiffness of pneumatic floats are envisaged.

A pneumatic conduit assembly 185 communicates with fill/dump valves 186 and a pressurized air supply and control valve, not shown. The floats are at correct pressure at take-off altitude, but the pressure differential with respect to ambient increases as the aircraft climbs. The valve could dump this excess pressure, or alternative pressure relief valves can be fitted in the bladders. When the aircraft descends, additional air is added to the float from the air supply pressurized by the turbine or electrical air pump, any excess being automatically dumped. The automatic fill means could also accommodate pressure differential changes due to ambient temperature changes. Individual one-way input valves for each bladder would allow topping up of the bladder.

FIGS. 14 through 16

A third embodiment 200 of the invention provides a float for use in an amphibious arrangement, wherein the float is fixed, and the wheels of the landing gear move relative to the float to permit the aircraft to use land or water. The third embodiment has two inflatable floats, one being shown and designated 202, which are secured to an aircraft, not shown, using structure similar to that required for supporting the non-amphibious float assembly 10 of FIGS. 1 through 6. The third embodiment has forward and aft transverse booms 204 and 205 which are secured by attachment means 207 as previously described to longitudinal stiffening members fitted in sleeves 206 extending axially along the float, one stiffening member 208 only being shown. Similarly to the floats 11 and 12, the float 202 has upper and lower walls 210 and 211, and laterally spaced apart side walls 213 and 214. The lower wall has a step 216 which divides the lower wall into forward and aft portions 217 and 218 respectively. Apart from details listed below, the float 202 is essentially the same as the float 11 for both internal and external details. Two main differences from the float 11 are as follows. A forward portion of the upper wall 210 has a transverse fabric sleeve 219 sewn thereto, which receives a transverse tube 220 as a tight fit. Similarly, the aft portion 218 of the lower wall 211 has an aft transverse tube 222 retained in a similar fabric transverse sleeve 213 secured to the lower wall portion 218. Air pressure within the bladders, not shown, forces the fabric tightly against the tubes, preventing rotation. The tubes 220 and 222 serve as foward and aft bearing means or bearing sleeves for forward and aft undercarriage leg assemblies 224 and 225 respectively as follows.

As seen in FIG. 15, the forward undercarriage leg assembly 224 is generally rectangular when viewed from the front, and has parallel generally horizontal inner and outer portions 227 and 228, and parallel side portions 229 and 230 interconnecting the inner and outer portions as shown. The inner portion is received within the forward transverse tube 220 and is rotatable therein when the forward undercarriage leg swings from a lowered position, shown in full outline in FIG. 14, to a raised position 224.1, shown in broken outline in FIG. 14. The side portions 229 and 230 are clear of side walls 213 and 214 of the float, but in the lowered position the outer portion 228 carries the forward portion 217 of the lower wall. The forward leg 224 has a castoring forward wheel 231 journalled on the outer portion 228, which permits easy maneouvring of the aircraft on the ground. Similarly to the float 11 as described with references to FIG. 3, the forward portion 217 has a tunnel 232, which is a recess defined by spaced-apart protrusions 234 and 235 which rest on the outer portion 228. Thus a portion of the weight of the aircraft is carried on the lower portion 228.

In FIG. 14, a control cable 236, such as a Bowden cable mounted on the float, is connected adjacent lower portions of the side portions 229, and when the cable is retracted it holds the undercarriage leg 224 in the extended position for landing on land. A similar control cable, designated generally at 238 is connected to a belt, not shown, which passes over the forwardmost portion of the float and is connected to the outer portion 228. When the cable 238 is retracted, the undercarriage leg is swung to the fully raised position, shown in broken outline at 224.1, in which the leg 224 is clear of the water.

As seen in FIG. 16, the aft undercarriage leg assembly 225 is similarly generally rectangular in shape but is foreshortened when viewed axially. The leg 225 has generally horizontal inner and outer portions 240 and 241 interconnected by generally parallel side portions 242 and 243. The inner portion 240 is received with the aft transverse tube 222, and is rotatable through an angle somewhat less than half a revolution to move the undercarriage leg 225 from an extended position, shown in full outline in FIG. 14, to a retracted position, shown in broken outline in FIG. 14 at 225.1. In the extended position, the outer portion 241 is engaged by an aft portion 244 of the forward portion 217 of the lower wall immediately forward of the step 216, and thus carries a portion of the aircraft weight. Preferably, the outer portion 244 is shaped to cradle the downwardly bowed, full width sheet stiffening member, not shown, adjacent and forward of the step, so as to diffuse loads into the float. The side portions 242 and 243 are adjustable telescopically, so as to permit variation in spacing between the inner and outer portions 241 and 240 to accommodate the different sizes of floats. The telescopic portions also permit variations of the position of the outer portion 241 to accommodate different locations of centres of gravity of aircraft and other factors affecting position of landing wheels 245.

The aft leg has a pair of spaced landing wheels 245 and 246 which are journalled on axles spaced below the outer portion 241, so as to increase clearance between the lower wall 211 and the ground, shown as a line 247, supporting the aircraft. Likewise, when the undercarriage leg is raised to 225.1, the wheels 245 and 246 similarly straddle the aft portion of the float, and are clear of the aft lower surface 218 of the float, thus reducing interference of the wheels with surface of the water, when the aircraft is supported on its floats.

A control cable 249 mounted on the float cooperates with the outer portion of the leg 225 to hold the leg in the raised or retracted position 225.1, and a similar control cable 251 cooperates with the leg to hold the cable in the lowered or extended position 225. Preferably, the control cables 236, 238, for controlling the forward leg 224, and the control cables 249 and 251 for controlling the aft leg 225, are coupled to a master control, operable by the pilot for raising and lowering the wheel simultaneously between the positions as shown. The opposite float would be essentially similar, but a mirror image thereof, and would similarly have undercarriage legs that are controlled simultaneously with those of the float 202.

It can be seen that the weight of the aircraft is transferred through the forward portion 217 of the lower float wall 211 onto the respective outer portion 228 and 241 of the forward and aft undercarriage leg assemblies. Because the forward leg is essentially a trailing link suspension, that is it is over-centered to be aft of the foward transverse tube 220, a portion of the weight of the aircraft is borne directly by the outer portion 228, and the leg 224 will swing about the forward tube 220 in response to resilience in the float itself. Thus, the load on the forward tube 220 is negligible, and shock loading, causing the float to deflect, is borne by swinging of the outer portion 228 against the float, thus relieving the upper tube 220 and inner portion 227 of load. The aft leg 225 is essentially a leading link suspension, in which the link, in the extended position, is over-centered to be forward of the aft tube 222, and shock loads are carried by the float deflecting and the tube 222 carries little weight. Clearly, there is a considerable resilience avaiable in the float, assuming it is at sufficiently low air pressure, to absorb normal landing shocks when the aircraft runs on a hard or bumpy surface.

In summary, it can be seen that the float has forward and aft undercarriage leg assemblies having ground bearing wheels adjacent outer portions thereof. Each leg assembly is hinged for rotation relative to the float about respective spaced forward and aft hinge axes 252 and 253 between lowered and raised positions. Thus in the lowered position, the wheels project below the float lower wall for use on land, and the float lower wall cooperates with the undercarriage legs to bear weight of the aircraft. In the raised position the wheels are above the float lower wall to be essentially clear of water when the float is used on water. The leg bearing means have generally parallel and horizontal hinge axes spaced axially along the float and disposed normally to the float.

I claim:

1. An inflatable float assembly for an aircraft having:
   (a) a flexible, tough, outer fabric tubular shell having elongated upper and lower walls interconnected by spaced first and second elongated side walls to form an elongated generally tubular float having an interior,
   (b) the lower wall of the float having a transversely extending step and forward and aft portions, the forward and aft portions being spaced vertically apart adjacent lower and upper transverse edges respectively of the step,
   (c) the upper wall of the float having a first elongated sleeve means extending longitudinally therealong,
   (d) a first elongated stiffening member extending longitudinally through the first sleeve means, the stiffening member being adapted to cooperate with the aircraft,
   (e) a plurality of baffles extending between at least one pair of oppositely spaced apart walls, so as to form a plurality of compartments within the interior of the float, the baffles including at least one transverse baffle located above and generally adjacent the step so as to divide the interior of the float into foward and aft compartments,
   (f) a plurality of inflatable airtight bladders, one bladder being fitted within each compartment of the float so that when the bladders are fully inflated with gas, the float assumes an essentially rigid form, the said transverse baffle controlling location of ends of bladders generally adjacent the step,
   (g) stiffening means extending forwardly from the lower transverse edge of the step along an aft portion of the forward lower wall of the float, so that the step has a relatively well defined lower corner so as to improve efficiency of planing and rotation of the float for take-off.

2. An inflatable float assembly as claimed in claim 1 further characterised by:

(a) the sleeve means having access means for providing access to the stiffening member,
(b) the stiffening member having exposed portions adjacent the access means of the sleeve,
(c) attachment means cooperating with the exposed portions of the stiffening member to permit the stiffening member to cooperate with an aircraft undercarriage.

3. An inflatable float assembly as claimed in claim 2 further characterised by:
(a) the upper wall of the float also having a second elongated sleeve means extending therealong, the second sleeve means also having access means, the first and second sleeve means being generally parallel and spaced transversely apart,
(b) a second elongated stiffening member extending through the second sleeve means, the second elongated stiffening member having exposed portions adjacent the access means of the second sleeve means,
(c) attachment means cooperating with the exposed portions of the second stiffening member to permit the second stiffening member to cooperate with the aircraft undercarriage.

4. An inflatable float assembly as claimed in claim 2 which:
(a) the first elongated sleeve means includes a plurality of longitudinally spaced apart sleeve members aligned with each other to receive the first stiffening member threaded therethrough, adjacent end portions of the sleeve members being spaced apart to expose the stiffening member to provide the access means for cooperation with longitudinally spaced first and second attachment means.

5. An inflatable float assembly as claimed in claim 4 in which the stiffening means is further characterised by:
(a) the aft portion of the forward portion of the float lower wall has a lower wall stiffener sleeve extending between the side walls of the float and forwardly of the step wall and a filler block pocket means adjacent the step wall within the float,
(b) the stiffening means include a relatively stiff stiffener sheet member located within the stiffener sleeve so as to stiffen the lower wall immediately forward of the step, and a relatively stiff filler block fitted within the filler pocket means.

6. An inflatable float assembly as claimed in claim 5 further characterised by:
(a) the plurality of baffles also includes at least one longitudinal baffle, the transverse baffle having a lower edge secured generally adjacent the step, so as to divide the float interior into a plurality of forward and aft compartments,
(b) the lower wall stiffener sleeve has two opposite side edges secured to respective side walls of the float,
(c) the stiffener sheet member extends continuously as one piece between side walls of the float and is bowed downwardly to increase its stiffness and to provide a crowned hull forward portion for the float,
(d) the filler block pocket means includes a closable fabric pocket provided at aft ends of each forward compartment of the float, and adjacent the lower wall of the float,
(e) the filler block has a right angled lower aft corner and an aft wall having a depth at least generally equal to depth of the step wall to define the step.

7. A float assembly as claimed in claim 1, further characterised by:
(a) a wear resisting cap releasably securable to and generally complementary to a forward lower portion of the float.

8. An inflatable float assembly as claimed in claim 1 further characterised by:
(a) the lower wall forward portion having a bow portion having a recessed central portion to define a tunnel which has a depth which diminishes aftwards and terminates forwardly of the step.

9. An inflatable float assembly as claimed in claim 2 having a float lowering and raising means characterised by:
(a) a first crank journalling means adapted to cooperate with the aircraft and a first crankshaft journalled therein to permit rotation about a first transverse crank axis, the crankshaft having a first crank arm extending to an outer portion thereof which sweeps through an arc as the first crankshaft is rotated,
(b) a first transverse float connecting means interconnecting the outer portion of the crank arm to the attachment means of the elongated stiffening member to permit relative rotation between the float and the crank arm,
so that rotation of the crankshaft through approximately one half of a revolution swings the floats between raised and lowered positions for landing on land and water respectively.

10. A float assembly as claimed in claim 9 further including:
(a) the first elongated sleeve means includes a plurality of longitudinally spaced apart sleeve members aligned with each other to receive the first stiffening member threaded therethrough, adjacent end portions of the sleeve members being spaced apart to expose the stiffening member to provide the access means for cooperation with longitudinally spaced first and second attachment means,
(b) a second crank journalling means adapted to cooperate with the aircraft so as to be generally longitudinally aligned with the first crank journalling means, and a second crankshaft journalled in the second crank journalling means to permit rotation about a second transverse crank axis which is parallel to and spaced longitudinally from the first crank axis, the second crankshaft having a second crank arm extending therefrom, the second crank arm having an outer portion which sweeps through an arc as the second crankshaft is rotated,
(c) a second transverse float connecting means interconnecting the outer portion of the second crank arm to the second attachment means to permit rotation between the second float connecting means and the second crank arm as the second crank shaft is rotated, the second float connecting means being secured by the attachment means to the elongated stiffening member,
(d) the first and second crank arms being disposed relative to each other so as to be in phase with each other, so that, when the float is in the lowered position for landing on water, the two crank arms are essentially parallel to each other and extend downwardly from the respective crank shaft journals to form a portion of a parallelogram mechanism.

11. An inflatable float assembly as claimed in claim 9 further characterised by:
  (a) the first and second crankshafts are connected together for mutual rotation to move respective portions of the float concurrently.

12. An inflatable float assembly as claimed in claim 9 in which the aircraft has undercarriage leg means which carry a transversely disposed axle, end portions of the axle being adapted to cooperate with respective landing wheels, the float assembly being further characterised by:
  (a) when the float is in the lowered position, the transverse float connecting means is aligned with the adjacent end portion of the axle,
  (b) latch means cooperate with adjacent end portions of the transverse float connecting means and the axle to releasably connect together in the said alignment the axle and the transverse float connecting means.

13. An inflatable float assembly as claimed in claim 1 further characterised by an enhanced float stiffening means having:
  (a) a generally vertically extending resilient spring means positioned approximately mid-way along the float,
  (b) fore and aft cables extending from a lower end of the spring means to forward and aft ends of the stiffening member respectively to form a triangulated truss.

14. An inflated float assembly as claimed in claim 13 further characterised by:
  (a) an upper end of the spring means cooperating with the stiffening member,
  (b) the lower end of the spring means cooperating with a plate adjacent the lower surface of the float.

15. An inflatable float assembly as claimed in claim 1 further characterised by valve means attached to said bladders, and further characterised by:
  (a) means cooperating with the valve means of the bladders to add gas to, or remove gas from, the bladders remotely, so as to maintain a required pressure differential between float pressure and ambient pressure.

16. An inflatable float assembly as claimed in claim 1 further characterised by:
  (a) the float assembly being fixed relative to the aircraft,
  (b) the float assembly having forward and aft undercarriage leg assemblies having ground bearing wheels adjcent outer portions thereof, each leg assembly being hinged for rotation relative to a respective float about respective spaced horizontal hinge axes between lowered and raised positions, so that, in the lowered position the wheels project below the float lower wall for use on land, and the float lower wall cooperates with the undercarriage legs to bear weight of the aircraft, and in the raised position the wheels are above the float lower wall to be essentially clear of water when the float is used on water.

17. A float assembly as claimed in claim 16 further characterised in that:
  (a) the float assembly has a forward leg bearing means adjacent the upper wall of the float, and an aft leg bearing means adjacent the lower wall of the float, the leg bearing means having generally parallel and horizontal bearing axes spaced axially along the float and disposed normally to the float,
  (b) the forward undercarriage leg assembly has an inner portion journalled in the forward bearing means, and two side portions spaced apart laterally to receive the float therebetween in the lowered position, the side portions being connected together by the outer portion so that, in the lowered position the lower wall of the float rests in the lower portion of the undercarriage leg to bear some weight of the aircraft,
  (c) the aft undercarriage leg assembly has an inner portion journalled in the aft bearing means, and two laterally spaced apart side portions connected together by the outer portion, which is adapted to contact the lower wall stiffener means of the float in the lowered position to support some weight of the aircraft.

18. An inflatable float assembly as claimed in claim 1 in which:
  (a) the transverse baffle has a lower edge secured adjacent to the step.

19. An inflatable float assembly as claimed in claim 18 in which:
  (a) the step has a transversely extending step wall having lower and upper transverse edges, the upper edge of the step wall being adjacent to the lower edge of the transverse baffle.

20. An inflatable float assembly as claimed in claim 19 in which:
  (a) the step wall is essentially upright,
  (b) the transverse baffle is generally aligned with the step wall.

21. An inflatable float assembly as claimed in claim 1 in which:
  (a) the stiffening means includes a relatively stiff stiffener sheet member, located adjacent to the aft portion of the forward portion of the float lower wall, the stiffener member having a rear edge generally adjacent to the step.

* * * * *

UNITED STATES PATENT AND TRADEMARK OFFICE
CERTIFICATE OF CORRECTION

PATENT NO. : 4,697,762

DATED : October 6, 1987

INVENTOR(S) : Donald B. Arney

It is certified that error appears in the above-identified patent and that said Letters Patent is hereby corrected as shown below:

Abstract, line 8 "preferable" should be --preferably--.

Column 3, line 61 "defrom" should be --deform--.

Column 4, line 29 "flat" should be --float--.

Column 5, line 26 "40" should be --48--.

Column 6, line 47 "forwad" should be --forward--.

Column 7, line 25 "11.2" should be --12.1--.

Column 7, line 32 "references" should be --reference--.

Column 8, line 17 "transverse 131" should be --transverse rod 131--.

Column 9, line 49 "to lock" should be --to again lock--.

Column 11, line 20 "to respective" should be --to receive respective--.

Column 13, line 32 "telescopic portions" should be telescopic side portions--.

UNITED STATES PATENT AND TRADEMARK OFFICE
CERTIFICATE OF CORRECTION

PATENT NO. : 4,697,762

DATED : October 6, 1987

INVENTOR(S) : Donald B. Arney

It is certified that error appears in the above-identified patent and that said Letters Patent is hereby corrected as shown below:

Column 15, line 26, "2 which" should read -- 2 in which --.

Signed and Sealed this

Twenty-sixth Day of April, 1988

Attest:

DONALD J. QUIGG

Attesting Officer

Commissioner of Patents and Trademarks